(12) United States Patent
Wiebe et al.

(10) Patent No.: US 9,106,159 B1
(45) Date of Patent: Aug. 11, 2015

(54) SYSTEM TO HARVEST ENERGY IN A WELLBORE

(71) Applicant: FOCUS TOOLS COLORADO, LLC, Denver, CO (US)

(72) Inventors: Darcy L. Wiebe, Denver, CO (US); Rene M. Rey, Denver, CO (US)

(73) Assignee: FOCUS TOOLS COLORADO, LLC, Denver, CO (US)

( * ) Notice: Subject to any disclaimer, the term of this patent is extended or adjusted under 35 U.S.C. 154(b) by 0 days.

(21) Appl. No.: 14/548,157

(22) Filed: Nov. 19, 2014

Related U.S. Application Data (63) Continuation-in-part of application No. 14/494,463, filed on Sep. 23, 2014, now Pat. No. 8,925,649.

(51) Int. Cl.
*E21B 7/24* (2006.01)
*H02N 2/18* (2006.01)

(52) U.S. Cl.
CPC *H02N 2/186* (2013.01); *E21B 7/24* (2013.01); *H02N 2/181* (2013.01)

(58) Field of Classification Search
CPC ............. E21B 7/24; E21B 4/006; H02N 2/18; H02N 2/186; H01L 41/1136; H01L 41/113

USPC ....................... 175/56, 93, 106; 310/339, 319
See application file for complete search history.

(56) References Cited

U.S. PATENT DOCUMENTS

| | | | |
|---|---|---|---|
| 5,934,882 | A | 8/1999 | Olney et al. |
| 7,982,370 | B2 | 7/2011 | Wang et al. |
| 8,410,667 | B2 | 4/2013 | Rastegar et al. |
| 8,564,178 | B2 | 10/2013 | Hsu et al. |
| 8,817,452 | B2 | 8/2014 | Nguyen et al. |
| 2009/0038848 | A1 | 2/2009 | Garcia-Osuna |
| 2014/0265580 | A1 | 9/2014 | Cooley et al. |

*Primary Examiner* — Kenneth L Thompson
*Assistant Examiner* — Wei Wang
(74) *Attorney, Agent, or Firm* — Buskop Law Group, PC; Wendy Buskop (57) ABSTRACT

A system to harvest mechanical energy in a wellbore, wherein the mechanical energy comes from motion. The system uses mechanical energy coming from at least one of: motion of a drill bit, motion of a drill string, motion of flowing air or drilling mud down the drill string to the drill bit and up an annulus between the drill string and the wellbore, and motion of a bottom hole assembly connected to the drill string. The system can include a plurality of piezoelectric stand bundles, wherein each individual piezoelectric strand can vibrate as the pressure housing moves in the wellbore, thereby producing electricity.

27 Claims, 8 Drawing Sheets

SYSTEM TO HARVEST ENERGY IN A WELLBORE

CROSS REFERENCE TO RELATED APPLICATIONS

The present application is a Continuation in Part of co-pending U.S. patent application Ser. No. 14/494,463 filed on Sep. 23, 2014, entitled "SYSTEM TO HARVEST ENERGY IN A WELLBORE". This reference is hereby incorporated in its entirety.

FIELD

The present embodiments generally relate to a system to harvest energy in a wellbore containing a drill string comprising interconnected tubulars.

BACKGROUND

Power for use in a downhole environment has generally in the past been either stored in a battery and conveyed downhole or the power has been transmitted via conductors, such as a wireline, from the space or another remote location. Batteries have the capability of storing only a finite amount of power therein and have environmental limits, such as temperature, on their use.

Electrical conductors, such as those in a conventional wireline, provide a practically unlimited amount of power, but require special facilities at the surface for deployment. These facilities typically block the production flow path (i.e., limiting the flow rate of fluids through the flow path) while the conductors are in the flow path. Thus, wireline operations are typically carried out prior to the production phase of a well or during remedial operations after the well has been placed into production.

In wellbore drilling operations, one or more efficient power sources are desirable to power downhole instrumentation. A wide variety of devices can use mechanical energy in order to perform work downhole. Those devices may be subject to a variety of forces and can release energy in a number of ways.

A need exists for a system of harvesting mechanical energy downhole and generating electrical power therefrom. A need exists for a system to harvest energy in a wellbore containing a drill string.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to systems to harvest energy in a wellbore containing a drill string using an enclosed waterproof hermetic pressure housing connected between a drilling collar and a universal bottom hole orientation (UBHO) sub assembly.

The pressure housing can be adapted to sustain an external pressure of at least 20,000 psi and maintain an internal pressure of about 1 atm. The pressure housing can be an enclosed waterproof hermetic pressure housing.

The internal chamber of the pressure housing can contain a pendulous member. One or more piezoelectric strand bundles can each be secured to the pendulous member. These piezoelectric strand bundles can vibrate and produce electricity as the pressure housing moves in the wellbore as a component of the drill string.

Electrodes can be connected to the piezoelectric strand bundles and receive electricity produced from the piezoelectric strand bundles. Each electrode can flow power from the piezoelectric strand bundles to a power conditioning circuit.

A power conditioning circuit is used to normalize the electricity received by the electrodes to within a predetermined range. This power conditioning circuit can be electrically connected to one or more energy storage devices.

The energy storage devices can be connected in series and receive the power from the power conditioning circuit within a predetermined range. Each energy storage device can contain a high temperature electrolytic double layer capacitor. Each high temperature electrolytic double layer capacitor can be adapted to sustain operating temperatures from −40 degrees Celsius to 300 degrees Celsius without damage, thereby forming a magnet free system for harvesting electricity while operating in a wellbore.

A benefit of the present embodiments is that the power is produced on site, thereby bypassing the transportation restrictions of fuel cells and lithium batteries. Further, the present embodiments provide power during quiet times of the bottom hole assembly.

A benefit of the present embodiments is that no lithium batteries, which can explode, are needed. Lithium batteries can cause huge fires at a drill site, or another work over location, and the present embodiments prevent such explosions. Further, when the tool is being tested, there is no possibility of explosion by a lithium battery, as the tool has no lithium battery.

A benefit of the present embodiments is that it is usable for operating measure-while-drilling equipment while drilling in a wellbore.

A benefit of the present embodiments is that it prevents death at a drill site by enabling fewer trips out of the hole, thereby creating a safer environment for field hands at a drill site.

The embodied systems are directed at harvesting energy in a wellbore. A pressure housing, typically waterproof and hermetically sealed, can be connected between a drilling collar and a sub assembly. In embodiments, a pendulous member can be anchored within the internal chamber of the pressure housing. The pendulous member can swing in a pendulum motion as the pressure housing moves in the wellbore.

Piezoelectric strand bundles, which can be comprised of individual piezoelectric strands of various lengths, can be secured to the pendulous member by an anchor. The piezoelectric strand bundles can swing freely in parallel with the pendulous member. The individual piezoelectric strands can vibrate as the pressure housing moves in the wellbore, thereby producing electricity. The electricity can flow to electrodes galvanically connected to the piezoelectric strand bundles and then to energy storage devices.

The systems can include a power conditioning circuit connected between the electrodes and the energy storage devices. The power conditioning circuit normalizes electricity from the electrodes and provides a voltage to the energy storage device within a predetermined range. A buck boost converter can be added to accept a range of input voltage levels less than a preset range and more than a preset range, and provide a voltage output within a predetermined output voltage range.

Figure 1:
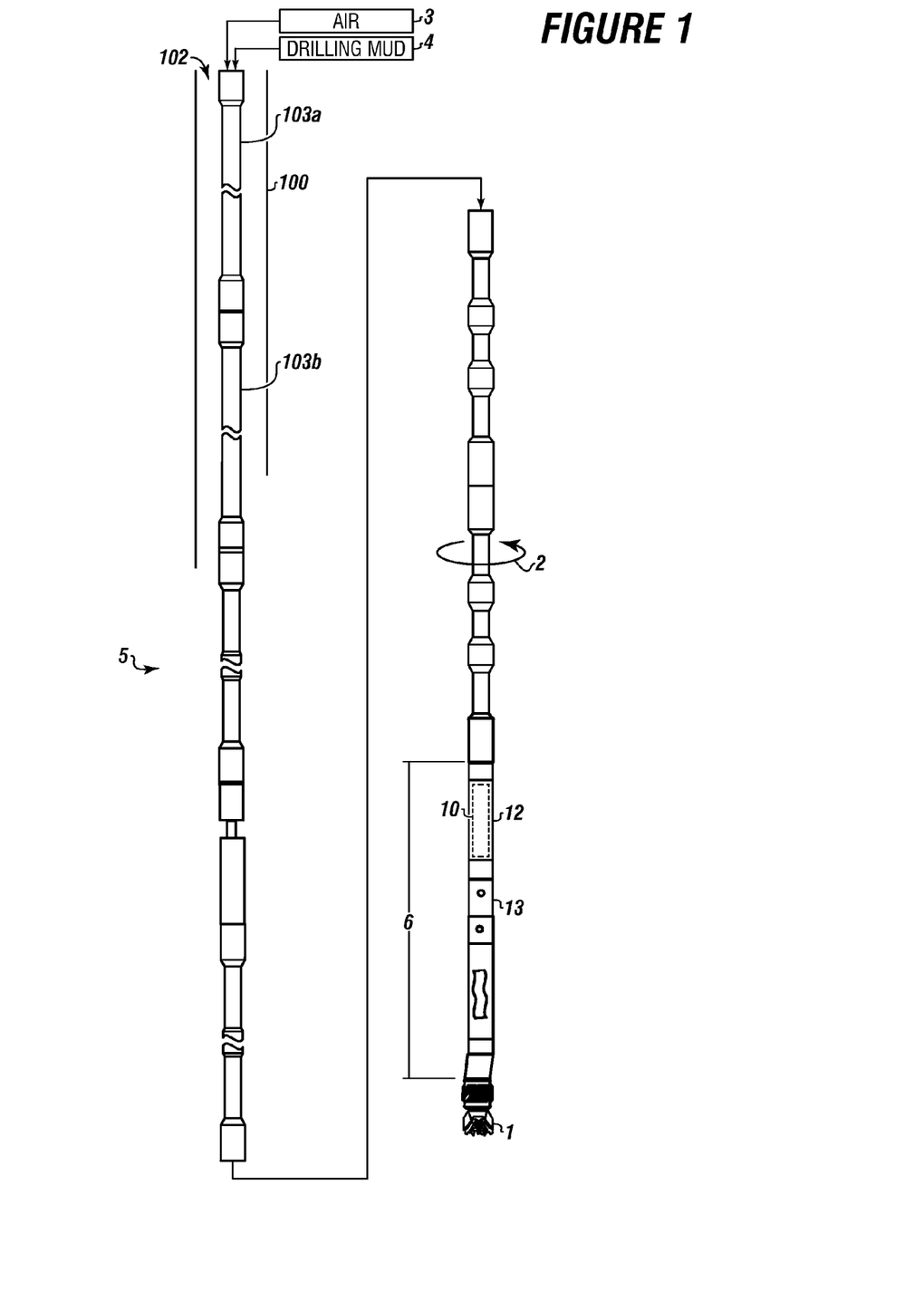
FIG. 1 depicts a drill string in a wellbore according one or more embodiments.

Turning now to the Figures, FIG. 1 depicts a drill string 5 in a wellbore 100 accordingly to one or more embodiments.

The drill string 5 can be made up of interconnected tubulars 103a and 103b. In embodiments, the drill string can be from a few feet to several miles in length.

A pressure housing 10 can be located within a drilling collar 12 and secured to a sub assembly 13 of a bottom hole assembly 6. The bottom hole assembly 6 can be connected to the drill string 5 proximate the drill bit 1. The sub assembly can be a universal bottom hole orientation (UBHO) sub assembly.

In embodiments, the pressure housing can be from 2 feet to 6.5 feet. The pressure housing can have a diameter from 1.875 inches to slightly less than the diameter of the tubulars used for the drill string. The pressure housing can be made from copper beryllium, such as TOUGHMET™, a copper alloy made by Materion of Michigan and Illinois. The pressure housing can be comprised of any suitable non-magnetic material. In embodiments, the pressure housing can have a coating disposed on the outside. The pressure housing 10, which can be waterproof and hermetically sealed, can be adapted to sustain external pressures of at least 20,000 psi while simultaneously maintaining an internal chamber pressure of around 1 atmosphere (atm) or another normal atmospheric pressure.

The drill string 5 can rotate and have a motion 2 of the drill string. Air 3 can flow into the drill string 5. The air 3 can be an air and foam mixture used for air drilling. Drilling mud 4 can also flow into the drill string 5. The air and the drilling mud can flow down the connected tubulars to the drill bit 1 and up an annulus 102 between the drill string 5 and the wellbore 100.

Figure 2:
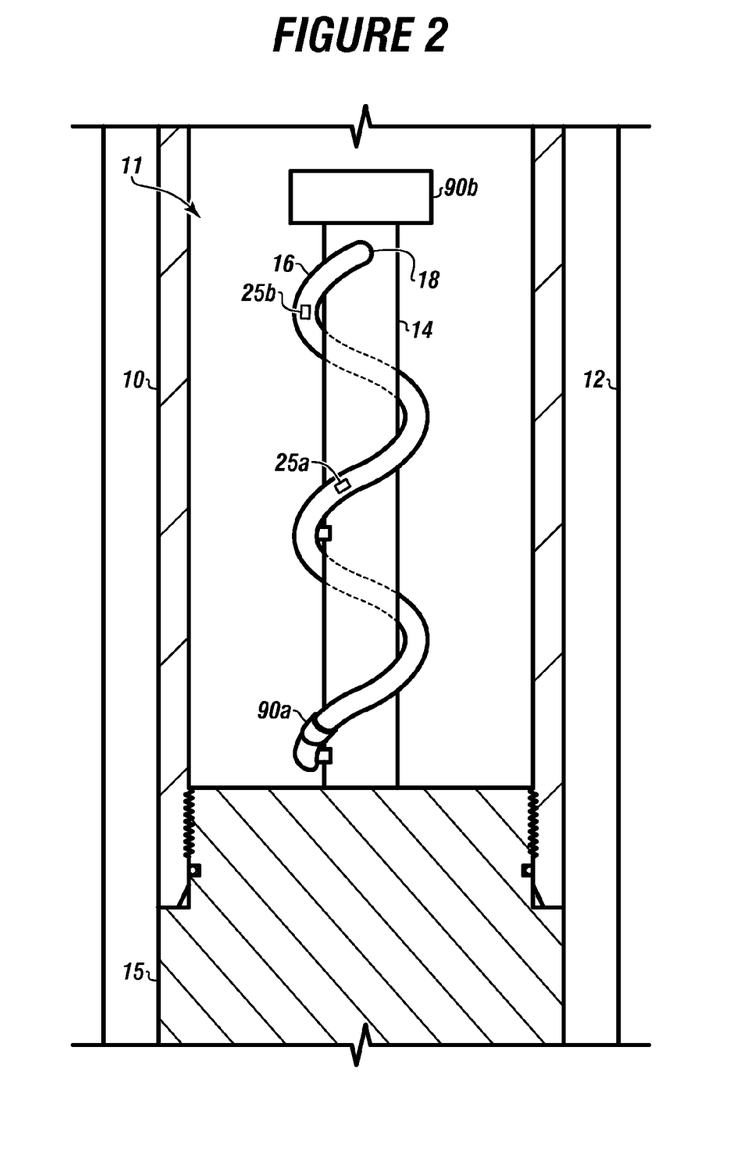
FIG. 2 depicts a cross sectional view of the portion of the system that harvests mechanical motion from movement while drilling according one or more embodiments.

FIG. 2 depicts a cross sectional view of the portion of the system that harvests the mechanical motion from movement while drilling accordingly to one or more embodiments.

The system harvests the mechanical energy coming from at least one of: a motion of the drill bit, a motion of the drill string, a motion of flowing air or drilling mud down the drill string to the drill bit and up the annulus between the drill string and the wellbore, and a motion of the bottom hole assembly connected to the drill string.

The pressure housing 10 can have an internal chamber 11.

The pressure housing 10 can be inside the drilling collar 12 and connected to the sub assembly. In embodiments, the pressure housing can connect to a bulkhead 15 which can attach to the sub assembly.

In embodiments, the pressure housing 10 can have a diameter from 20 percent to 95 percent less than a diameter of the drilling collar 12.

A pendulous member 14 can be within the internal chamber 11 and can be anchored on one end of the internal chamber 11. The pendulous member is shown anchored to the bulkhead 15.

The pendulous member 14 can be adapted to swing in a pendulum motion with the mechanical energy coming from at least one: motion of the drill bit, motion of the drill string, motion of flowing air or drilling mud down the drill string to the drill bit and up the annulus between the drill string and the wellbore, and motion of the bottom hole assembly connected to the drill string.

In embodiments, the pendulous member 14 can be cylindrical. In embodiments, the pendulous member can have another shape. Examples of other shapes can include a dog bone shape, a cylinder shape, a ball shape on a rod, an extended longitudinally curvilinear object, a cable with a deadweight on a freely swinging end, or combinations thereof.

In embodiments, two or more pendulous members can be within the internal chamber 11.

A piezoelectric strand bundle 16 can be secured to the pendulous member 14 on one end.

An anchor 18 can be used to secure the piezoelectric strand bundle 16 to the pendulous member 14. Multiple anchors can be used at intervals appropriate to the piezoelectric strand bundle lengths in order to exploit nodal peaks and valleys according to excitation frequencies.

In embodiments, both ends of the piezoelectric strand bundle 16 can be anchored to the pendulous member 14. In embodiments, each of the piezoelectric strand bundles 16 can be adapted to freely swing in parallel with the swinging of the pendulous member 14.

The piezoelectric strands within the piezoelectric strand bundles 16 can vibrate as the pressure housing 10 moves in the wellbore. In embodiments, the piezoelectric strands can be made of a piezoelectric fiber-composite material. In embodiments, each of the piezoelectric strands can have a diameter from a few thousandths of an inch to a few tenths of an inch. The lengths of the piezoelectric strands can range from a few inches to 10 feet. In embodiments, from 2 piezoelectric strands to 100 piezoelectric strands can be in a piezoelectric strand bundle 16.

In embodiments, a weight 90a can be secured to each of the piezoelectric strand bundles to increase the coefficient of transfer of energy from the strands of piezoelectric material to the electrodes. In embodiments, a weight 90b can be secured to the pendulous member 14 to tune the effect of the vibration on the strands of piezoelectric material.

Tuning to frequencies is a significant and unexpected benefit of this system. Tuning can be performed by the system using the weight and calculating a ratio of components of the strand bundle to accommodate acoustic frequencies produced by the drilling equipment.

An example of the tuning ratio can be 10:13:20 which represents: a mass of the weight (10 ounces): a number of piezoelectric strands (13 strands) in a piezoelectric strand bundle: and a length of piezoelectric strands (20 inches) in the piezoelectric strand bundle.

In embodiments, the piezoelectric strands can be disposed equidistantly around the pendulous member 14.

A plurality of electrodes 25a and 25b can be attached to the piezoelectric strand bundle 16 and receive electricity produced by vibrations of the piezoelectric strands in the piezoelectric strand bundle. Multiple electrodes can be used and spaced along the piezoelectric strand bundle length to better exploit nodal peaks and valleys according to excitation frequencies.

The pendulous member moves in three axis.

Figure 3:
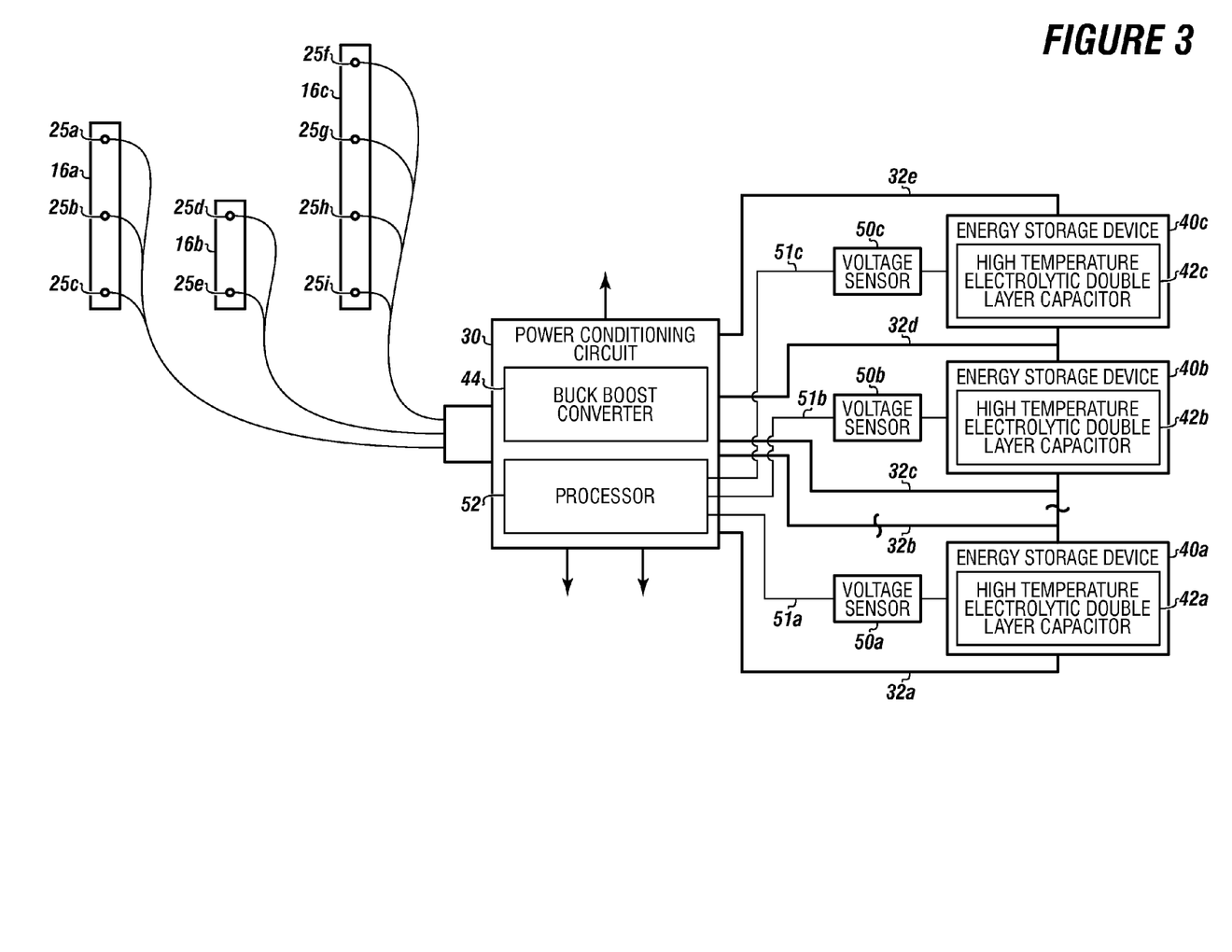
FIG. 3 depicts a block diagram of the electrical system according one or more embodiments.

FIG. 3 depicts a block diagram of the electrical system accordingly to one or more embodiments.

A plurality of piezoelectric strand bundles 16a-16c are depicted. Each of the piezoelectric strand bundles is shown having a different length. Each of the piezoelectric strand bundles can be galvanically connected to at least two electrodes.

The plurality of electrodes 25a-25i are shown. Each electrode can receive electricity produced by vibrating piezoelectric strands in each of the piezoelectric strand bundles. The electricity gathered by the electrodes can be directed to a power conditioning circuit 30. The power conditioning circuit can normalize the electricity from each of the electrodes and provide a voltage 32a-32e within a predetermined range. The voltages can range from 20 volts to 200 volts.

The vibrating piezoelectric strands can produce alternating current (A/C current).

In embodiments, the power conditioning circuit 30 can include a buck boost converter 44. The buck boost converter 44 can accept a range of input voltage levels less than the 20 volt to 200 volt preset range and more than the 20 volt to 200 volt preset range and provide a voltage output within a predetermined output voltage range. Usable buck boost converters can be made by Focus Tools of Colorado, LLC.

The voltage output range can be modifiable by an operator using a processor 52. In embodiments, the processor can be an embedded microprocessor.

In embodiments, the voltage output can be as low as 60 volts and high as 220 volts.

The power conditioning circuit 30 can monitor and control inputs from the electrodes and monitor and control voltage.

The voltage 32a-32e can be sent to energy storage devices 40a-40c. In an embodiment, each energy storage device can contain a high temperature electrolytic double layer capacitor 42a-42c.

Each high temperature electrolytic double layer capacitor can be adapted to sustain operating temperatures from −40 degrees Celsius to 300 degrees Celsius without being damaged.

The system can form a magnet free system for harvesting electricity while operating in a wellbore.

In embodiments, at least one voltage sensor 50a-50c can transmit voltage signals 51a-51c to the processor 52 of the power conditioning circuit 30. The processor 52 can balance voltage between energy storage devices 40a-40c as each of the energy storage devices charges and discharges power.

The energy storage devices can be connected in series for receiving voltage 32a-32e from the power conditioning circuit 30 within a predetermined range. The energy storage devices are not lithium batteries.

Figure 4:
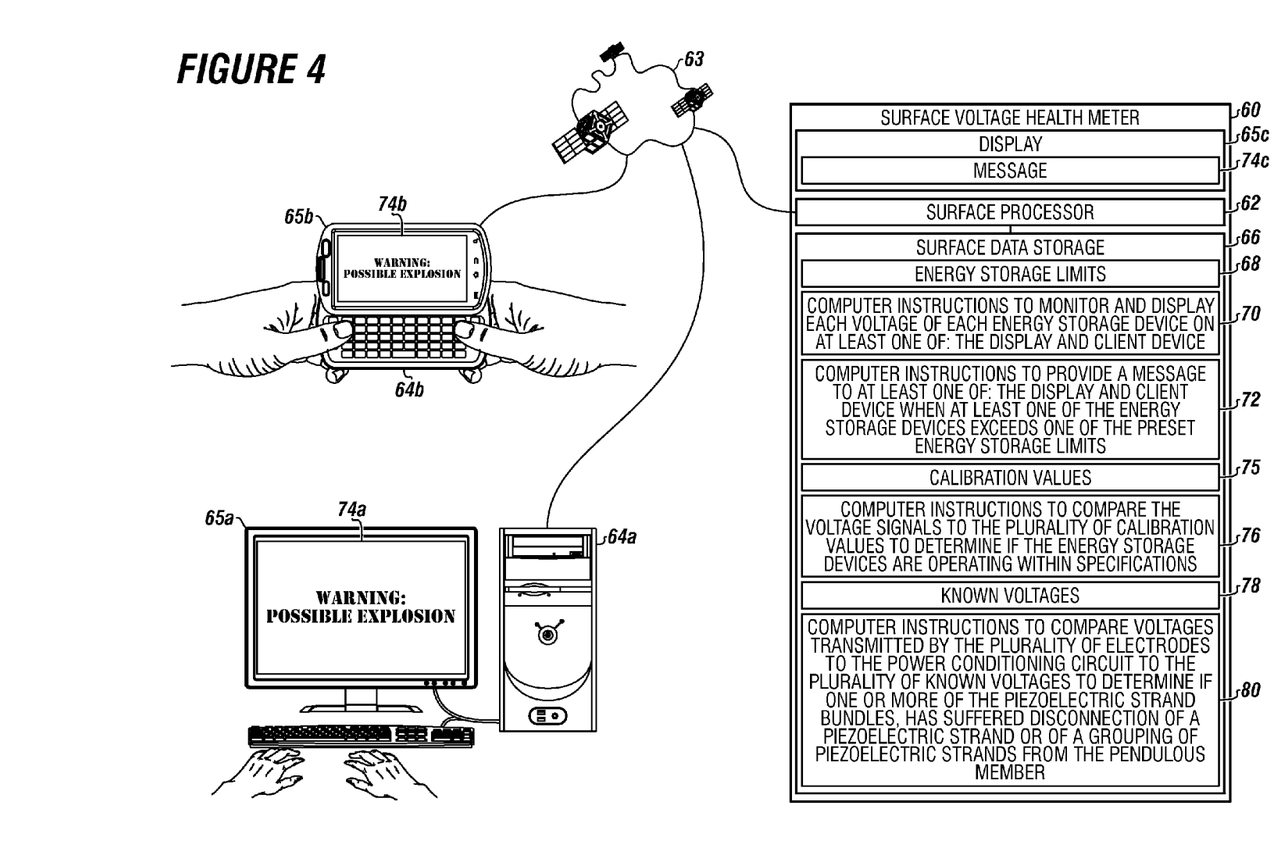
FIG. 4 depicts a diagram of a surface voltage health meter usable at the surface and outside of the wellbore according one or more embodiments.

FIG. 4 depicts a diagram of the surface voltage health meter 60 usable at the surface and outside of the wellbore accordingly to one or more embodiments.

The surface voltage health meter 60 can have a display 65c for presenting a message 74c to a user, such as a warning of a dangerous downhole condition or status of power downhole. The surface voltage health meter 60 can monitor and display the voltage of each energy storage device.

The surface voltage health meter 60 can have a surface processor 62 in communication with at least one client device 64a and 64b. Client device 64a is shown as a desk top computer and client device 64b is shown as a handheld device.

The surface processor 62 can communicate via a network 63. The network 63 can be a cellular network, a satellite network, a local area network, a wide area network, a fiber optic network, the internet, any known internet known in the industry, and combinations thereof. The network can communicate between the surface processor and at least one client device in a wired or wireless manner. The surface processor can be used to execute computer instructions in a surface data storage 66.

Each client device 64a and 64b can have a display 65a and 65b respectively and messages 74a and 74b can be viewed on the displays.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The surface data storage 66 can include energy storage limits 68.

The surface data storage 66 can include computer instructions 70 to monitor and display each voltage of each energy storage device on at least one of: the display and the client device. The voltage can be shown on the display of the surface voltage health meter and/or can be sent to one or more client devices.

If one of the energy storage devices exceeds one of the energy storage limits, the surface voltage health meter can send a message, such as "warning imminent explosion," to the display of the surface voltage health meter and/or to one or more client devices.

The surface data storage 66 can include computer instructions 72 to provide a message to at least one of: the display and client device when at least one of the energy storage devices exceeds one of the preset energy storage limits.

In embodiments, the surface data storage 66 can include calibrations values 75.

The surface data storage 66 can include computer instructions 76 to compare the voltage signals from the electrodes to the plurality of calibrations values to determine if the energy storage devices are operating within specifications.

If at least one of the voltage signals exceeds one of the preset calibrations values, the surface voltage health meter can send a message to the display of the surface voltage health meter and/or to one or more client devices.

In embodiments, the surface data storage 66 can include known voltages 78 for each of the piezoelectric strand bundles.

The surface voltage health meter 60 can compare the voltage signals from the electrodes to the known voltages 78.

If at least one of the voltage signals exceeds one of the known voltages, the surface voltage health meter can send a message to the display of the surface voltage health meter and/or to one or more client devices.

The surface data storage 66 can include computer instructions 80 to compare voltages transmitted by the plurality of electrodes to the power conditioning circuit to the plurality of known voltages to determine if one or more of the piezoelectric strand bundles, has suffered disconnection of a piezoelectric strand or of a grouping of piezoelectric strands from the pendulous member.

Figure 5:
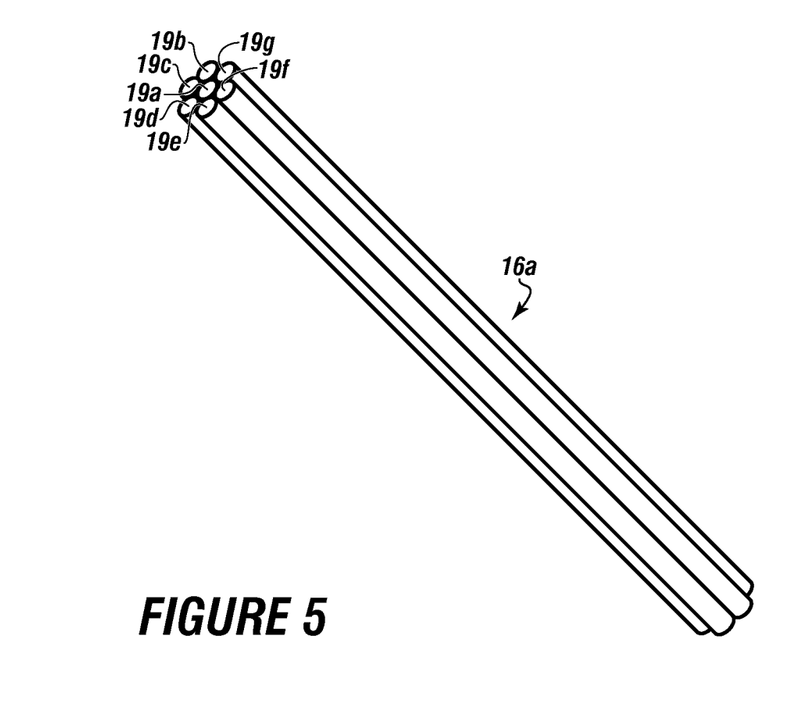
FIG. 5 depicts a piezoelectric strand bundle with a plurality of piezoelectric strands according one or more embodiments.

FIG. 5 depicts a piezoelectric strand bundle 16a with a plurality of piezoelectric strands 19a-19g accordingly to one or more embodiments.

Figure 6A:
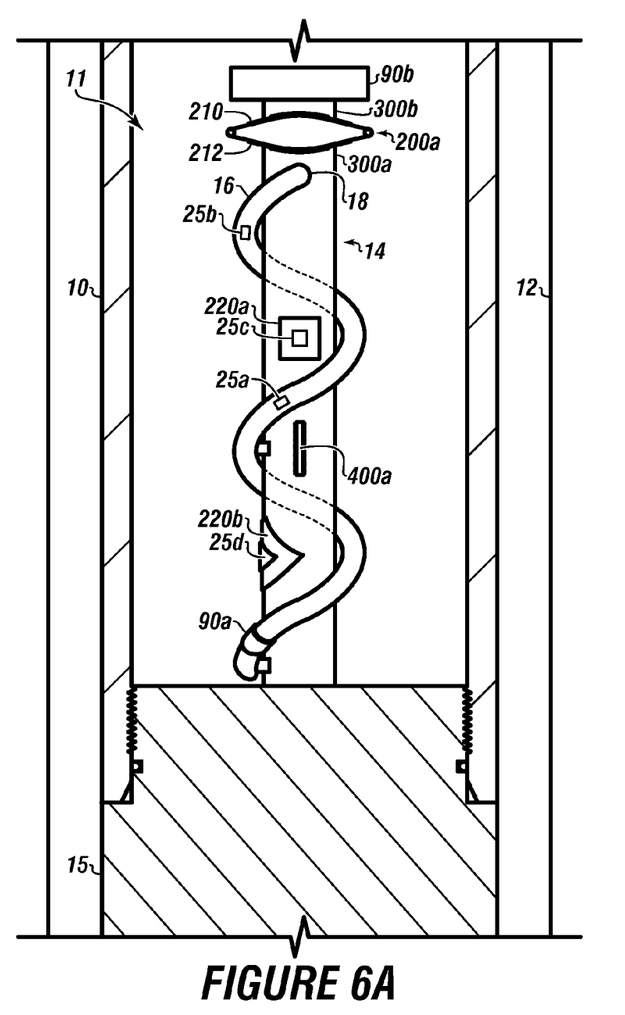
FIG. 6A depicts another cross sectional view of the portion of the system that harvests mechanical motion from movement while drilling according one or more embodiments.

FIG. 6A depicts another cross sectional view of a portion of the system that harvests mechanical motion from movement while drilling according one or more embodiments.

The pressure housing 10 with the internal chamber 11 can be inside the drilling collar 12 and anchored to the bulkhead 15 which can connect to the sub assembly. The internal chamber pressure is typically from 0.8 atm to 1.2 atm.

In this embodiment, a segmented pendulous member 14 is shown having two segments 300a and 300b. One segment 300a is anchored to the bulkhead 15.

A double bow spring station 200a joins the first segment 300a to the second segment 300b.

The double bow spring station 200a has a bottom side 212 connected to a top side 210. The top side can have a plurality of edges. In embodiments, the bottom side can be connected to the top side at the plurality of edges.

The bottom side 212 of the double bow spring station 200a can be spaced apart from the top side 210 of the double bow spring station 200a allowing the segmented pendulous member 14 to move along a vertical axis while the double bow spring station flexes between the connected edges of the double bow spring station.

The segmented pendulous member 14 with the double bow spring station 200a is configured to simultaneously swing in a pendulum motion as motion is transferred to the segmented pendulous member and move axially using the double bow spring station.

The motion is caused by movement from the drill bit (or drill bits), drill string, flowing air (as the air moves down the drill string to the drill bit and up an annulus between the drill string and the wellbore), flowing drilling mud (as the drilling mud moves down the drill string to the drill bit and up the annulus between the drill string and the wellbore); and/or the bottom hole assembly connected to the drill string.

A piezoelectric strand bundle 16 is shown wrapped helically around one of the segments of the pendulous member, namely segment 300a.

The piezoelectric strand bundle 16 contains a plurality of piezoelectric strands. Each of the piezoelectric strands vibrates as motion is transferred to the pendulous member. Each of the piezoelectric strands can be made from a fiber composite, such as silicon dioxide or PZT.

The anchor 18 can be used to secure the piezoelectric strand bundle 16 to the segmented pendulous member 14. Multiple anchors can be used at intervals appropriate to the piezoelectric strand bundle length in order to exploit nodal peaks and valleys according to piezoelectric strand bundle excitation frequencies.

In embodiments, a weight 90a can be secured to each of the piezoelectric strand bundles 16 to increase the coefficient of transfer of energy from the strand bundle of piezoelectric material to the electrodes.

In embodiments, a weight 90b can be secured to the segmented pendulous member 14 to tune the effect of the vibration on the strands of piezoelectric material.

Two piezoelectric strand bundle sheets 220a and 220b are shown. Each of the piezoelectric strand bundle sheets is mounted directly to one of the segments of the segmented pendulous member 14.

In other embodiments, the piezoelectric strand bundles sheets can be mounted to the bottom side 212 of the double bow spring station 200a.

In still other embodiments, the piezoelectric strand bundle sheets can be mounted on both the top side 210 and the bottom side 212 of the double bow spring station 200a.

A tab 400a is shown extending from a segment 300a of the segmented pendulous member 14. Secured to the tab 400a can be another piezoelectric strand bundle sheet which is not viewable in this Figure.

Each of the piezoelectric strand bundle sheets can have one or more piezoelectric strands, and each of the piezoelectric strands in the piezoelectric strand bundle sheet vibrates as external motion is transferred to the segmented pendulous member.

One or more electrodes can connect to each of the piezoelectric strand bundles and each of the piezoelectric strand bundle sheets mounted to the segmented pendulous member. The electrodes receive electricity produced by vibrations of each of the piezoelectric strands. One or more energy storage devices can receive a voltage from the electrodes.

A plurality of electrodes 25a-25d are depicted. Electrodes 25a and 25b are shown connected to the piezoelectric strand bundle 16. Electrode 25c is shown connected to piezoelectric strand bundle sheet 220a and electrode 25d is shown connected to piezoelectric strand bundle sheet 220b.

In embodiments, electrodes 25c and 25d can each be in a set or pair of electrodes which cannot be seen in this Figure.

Figure 6B:
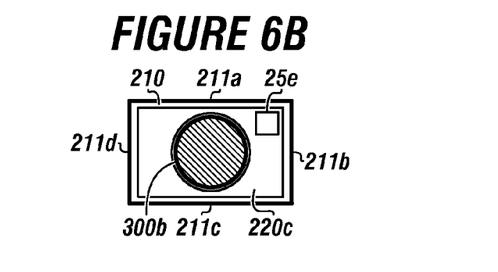
FIG. 6B depicts a top view of a double bow spring station.

FIG. 6B depicts a top cross sectional view of one of the double bow spring stations.

This double bow spring station has a top side 210 with edges 211a, 211b, 211c, and 211d.

A piezoelectric strand bundle sheet 200c is shown mounted to the double bow spring station on the top side 210.

The segment 300b of the segmented pendulous member and an electrode 25e, which can be one of the pair of electrodes that can connect to the piezoelectric strand bundle can be seen in this Figure.

Figure 7:
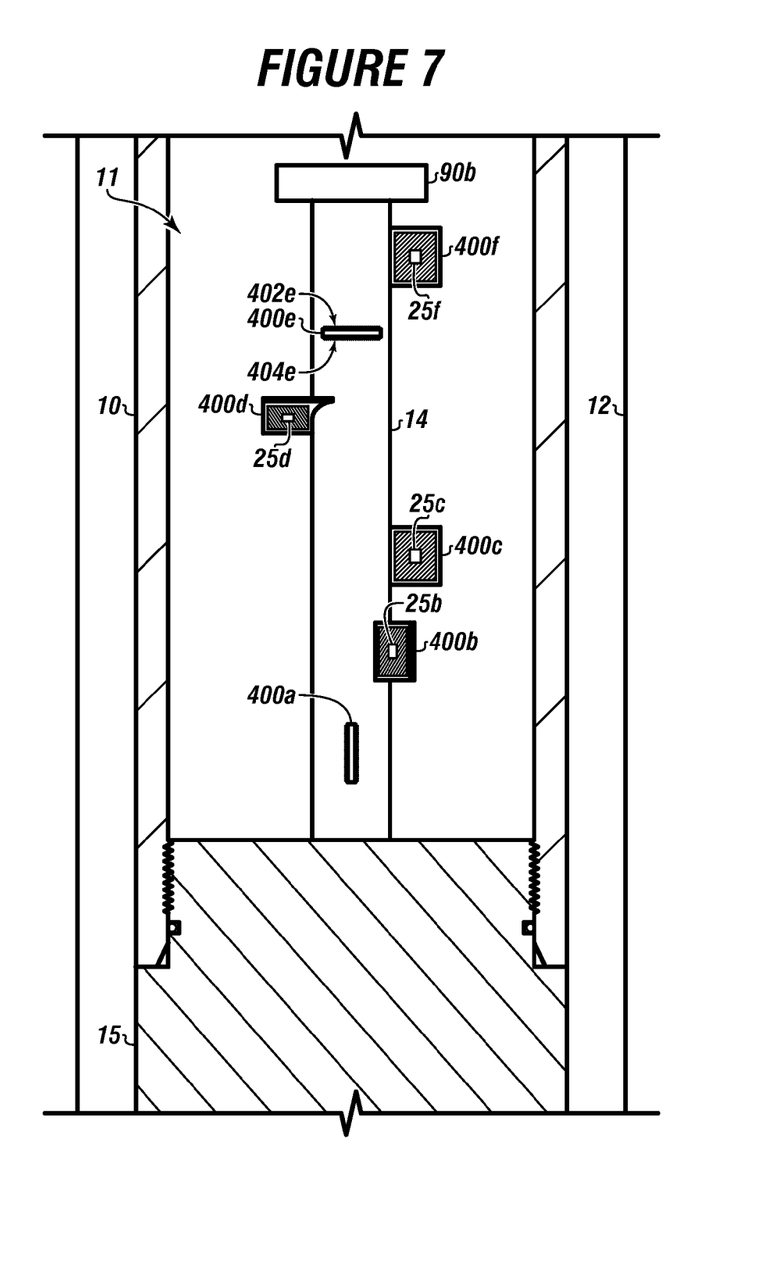
FIG. 7 depicts another cross sectional view of the portion of the system that harvests mechanical motion from movement while drilling according one or more embodiments.

FIG. 7 depicts another cross sectional view of a portion of the system that harvests mechanical motion from movement while drilling according one or more embodiments.

The pressure housing 10 with the internal chamber 11, which can be inside the drilling collar 12 and anchored to the bulkhead 15 can be seen.

In this embodiment, a non-segmented pendulous member 14 is anchored to the bulkhead 15 of the internal chamber 11. In this embodiment, the non-segmented pendulous member 14 is configured to swing in a pendulum motion as noted throughout this description.

In this embodiment, one or more tabs 400a-400f are shown mounted to the non-segmented pendulous member 14. The plurality of tabs are shown mounted in a helical pattern. In an embodiment, the tabs can be from 2 inches to 6 inches apart. The tabs can be spaced closer together or further apart depending on the needs of the user. In embodiments, the tabs can be grouped together, such as in clusters. In embodiments, the clusters can have 3 tabs to 10 tabs per group, wherein each group can be spaced helically apart from other groups.

In this embodiment, each tab is configured to extend away from the non-segmented pendulous member 14.

In embodiments, each tab can be rectangular in shape, square in shape, trapezoidal or curvilinear in shape as well.

Each tab has a first side and a second side. For example, tab 400e is shown with a first side 402e and a second side 404e.

In embodiments, the piezoelectric strand bundles sheets can be mounted to a tab or each of the tabs.

Each of the piezoelectric strands in the piezoelectric strand bundle sheet vibrates as external motion is transferred to the pendulous member which in turn transfers motion to the tabs.

Electrodes are connected to each of the piezoelectric strand bundle sheets to receive electricity produced by vibrations of each of the piezoelectric strands.

Electrodes 25b, 25c, 25d, and 25f are shown. Each electrode shown is only one of a pair of electrodes connected to each of the piezoelectric strand bundle sheets.

As depicted in other figures, one or more energy storage devices can be used to receive the voltage from the pairs of electrodes attached to each of the piezoelectric strand bundle sheets.

The tabs can include one or more vertical orientation tabs, such as tab 400f. Each vertical orientation tab vibrates due to the pendulum motion of the pendulous member from an anchor point.

The tabs can include one or more horizontal orientation tabs, such as tab 400e. Each horizontal orientation tab vibrates due to vertical motion of the pendulous member from the anchor point.

The tabs can include one or more angular orientation tabs 400d. Each angular orientation tab having with an orientation bias between the vertical orientation tab and the horizontal orientation tab. Each angular orientation tab vibrates from vertical and horizontal motion imparted to the system.

In embodiments, a weight 90b can be secured to the non-segmented pendulous member 14 to tune the effect of the vibration on the strands of piezoelectric material.

Figure 8:
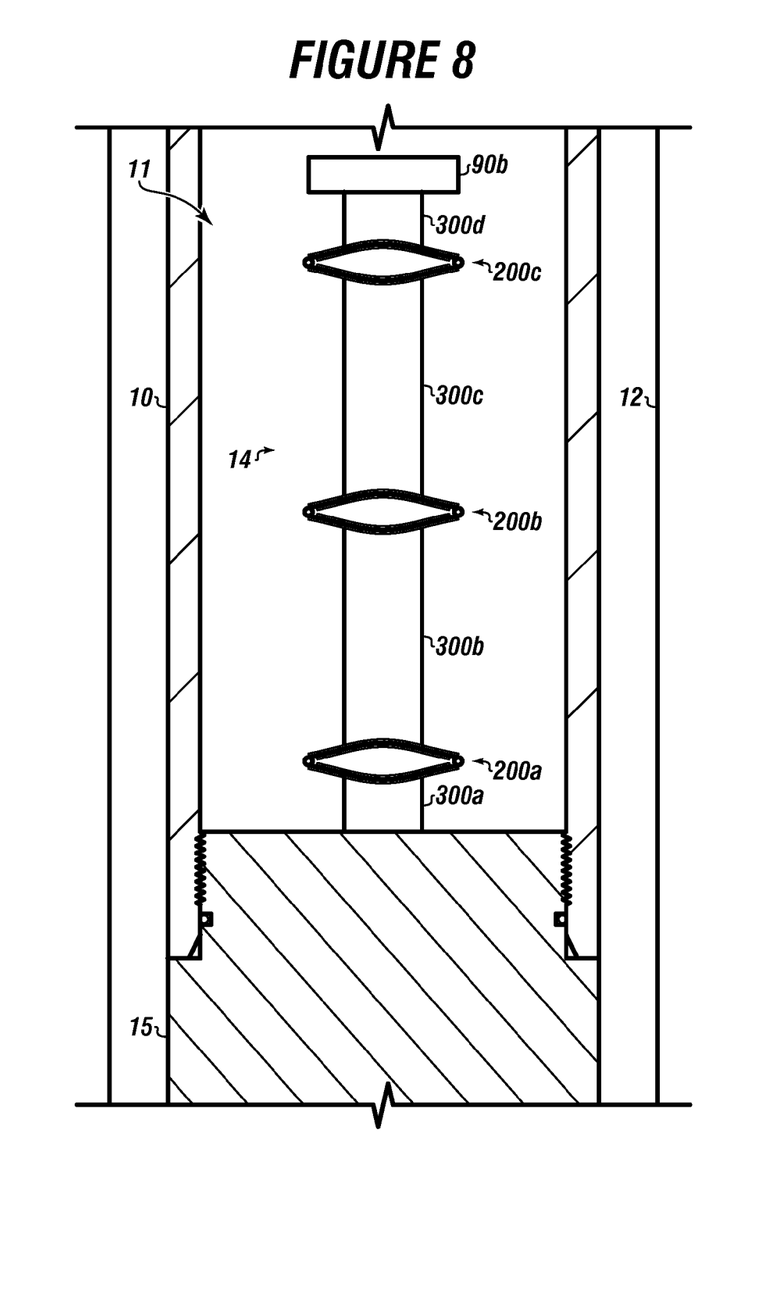
FIG. 8 depicts still another cross sectional view of the portion of the system that harvests mechanical motion from movement while drilling according one or more embodiments.

FIG. 8 depicts another cross sectional view of a portion of the system that harvests mechanical motion from movement while drilling according one or more embodiments.

The pressure housing 10 with the internal chamber 11 is shown inside the drilling collar 12 and anchored to the bulkhead 15.

In this embodiment, more than one double bow spring station can be used.

Three double bow spring stations 200a, 200b, and 200c are shown in this Figure. The segmented pendulous member 14 is divided into four segments 300a, 300b, 300c, and 300d. Each segment is connected to the previous segment by a double bow spring station.

In embodiments, from 1 segment to 100 segments can be used to form the segmented pendulous member. Each segment can have a small diameter, and the segments can be clusters of segments, such as 4 segments in parallel can connect between two double bow spring stations. For example, each segment can have a diameter from 0.1 inches to 0.5 inches. In embodiments, each segment can be solid. In embodiments, each segment can be hollow. In embodiments, some of the segments can be perforated.

In embodiments, a weight 90b can be secured to one or segments of the segmented pendulous member 14 to tune the effect of the vibration on the strands of piezoelectric material. In other embodiments, the weight 90b can be secured to a plurality of segments that form the last portion of the segmented pendulous member. In other embodiments, a weight can be mounted to a plurality of segments of the segmented pendulous member.

Multiple double bow spring stations enable the segmented pendulous member to simultaneously perform two different motions: (i) a swinging motion, as in a pendulum motion as motion is transferred to the pendulous member from the drill string or from components attached to or passing through the drill string, and (ii) an axial motion transferred to the double bow spring stations from the drill string or from components attached to or passing through the drill string.

More specifically, the motion is derived from the drill bit(s), movement of the drill string; flowing air (as the air moves down the drill string to the drill bit and up an annulus between the drill string and the wellbore), flowing mud (as the drilling mud moves down the drill string to the drill bit and up the annulus between the drill string and the wellbore), and the bottom hole assembly connected to the drill string.

As described herein, one or more piezoelectric strand bundle sheets can be mounted to each double bow spring station on the top side and/or the bottom side.

Furthermore, each of the piezoelectric strand bundle sheets can be composed of one or more piezoelectric strands. Each of the piezoelectric strand bundle sheets vibrates as external motion is transferred to the pendulous member which in turn transfers motion to the double bow spring station.

Pairs of electrodes are used to receive electricity produced by vibrations of each of the piezoelectric strands and one or more energy storage devices are used to receive the voltage from the pairs of electrodes.

The embodiments herein contemplate that the systems described herein can be applied in methods of use.

The embodied systems can be used in methods where the strands are applied to dual leaf spring structures which respond to axial and radial movement of the pendulous member. These pendulous members can be stacked such that the several stations are available for energy harvesting. These stations can be stacked and not rotated, relative to each other, or arranged so that each is rotated a few degrees relative to the one above (ie, a helical pattern).

The embodied systems can be used in methods where a multiplicity of very flexible wings or tabs, are attached to the pendulous member. Each wing or tab can have one or more strands attached, extending from the base outwards, such that the strands are exposed to the flexing of the wings or tabs.

The embodied systems can be used in methods where piezoelectric fiber strands are applied to multiple locations along the pendulous member.

All methods can be used simultaneously with the original helically wound methods described herein, or any by itself, or in any combinations. In all cases, the currents collected by the electrodes, regardless of the configuration, can be delivered to a power conditioning circuit.

Applicants specifically are not using a rotary inertia energy generator or a linear energy inertia generator to generate power in the invention.

Applicants in all embodiments use approximately atmospheric pressure or less in the pressure housing.

While these embodiments have been described with emphasis on the embodiments, it should be understood that within the scope of the appended claims, the embodiments might be practiced other than as specifically described herein.

What is claimed is:

1. A system to harvest mechanical energy in a wellbore, wherein the mechanical energy comes from motion, the system comprising:
   a. a pressure housing with an internal chamber having a bulkhead, wherein the pressure housing is inside a drilling collar and connected to a sub assembly;
   b. a segmented pendulous member, the segmented pendulous member having a plurality of segments, with a first segment anchored to the bulkhead in the internal chamber;
   c. a double bow spring station, the double bow spring station connected between the first segment and another segment of the segmented pendulous member, the double bow spring station comprising:
      (a) a top side with a plurality of edges; and (b) a bottom side connected to the top side only at the plurality of edges; and
wherein the segmented pendulous member with the double bow spring station is configured to simultaneously: (i) swing in a pendulum motion as the motion is transferred to the segmented pendulous member and (ii) move axially using the double bow spring station, with the motion from at least one of:
1. a drill bit;
2. a drill string;
3. air as the air moves down the drill string to the drill bit and up an annulus between the drill string and the wellbore;
4. drilling mud as the drilling mud moves down the drill string to the drill bit and up the annulus between the drill string and the wellbore; and
5. a bottom hole assembly connected to the drill string;
d. at least one piezoelectric strand bundle wrapped helically around one of the segments of the segmented pendulous member, the at least one piezoelectric strand bundle comprising a plurality of piezoelectric strands, each of the piezoelectric strands vibrating as motion is transferred to the segmented pendulous member;
e. at least one piezoelectric strand bundle sheet mounted to at least one of:
(i) the double bow spring station on the top side, the bottom side, or both the top side and the bottom side;
(ii) a segment of the segmented pendulous member; and
(iii) a tab extending from the segmented pendulous member, and wherein each of the piezoelectric strand bundle sheets comprises a plurality of piezoelectric strands, each of the piezoelectric strands vibrating as external motion is transferred to the segmented pendulous member;
f. a plurality of electrodes, wherein at least two electrodes are connected to each of at least one of: the at least one piezoelectric strand bundle and the at least one piezoelectric strand bundle sheet to receive electricity produced by vibrations of each of the piezoelectric strands; and
g. at least one energy storage device for receiving a voltage from the plurality of electrodes.

2. The system of claim 1, comprising a power conditioning circuit connected to the plurality of electrodes, wherein the power conditioning circuit normalizes electricity from the plurality of electrodes and provides the voltage to the at least one energy storage device within a predetermined range, and wherein the power conditioning circuit comprises a processor.

3. The system of claim 2, further comprising at least one voltage sensor, wherein the at least one voltage sensor is connected to the at least one energy storage device, and wherein the at least one voltage sensor is configured to transmit voltage signals to the power conditioning circuit.

4. The system of claim 1, further comprising a surface voltage health meter comprising a surface processor connected to a surface data storage, wherein the surface data storage comprises:
a. preset energy storage limits;
b. computer instructions to instruct the processor to monitor and display each voltage of the at least one energy storage device on at least one of: at least one display, at least one client device, or the at least one display and the at least one client device; and
c. computer instructions to instruct the processor to provide a message to at least one of: the at least one display, the at least one client device, or both the at least one display and the at least one client device when the energy storage device exceeds one of the preset energy storage limits.

5. The system of claim 1, wherein the pressure housing is adapted to sustain an external pressure of at least 20,000 psi while simultaneously maintaining an internal pressure of 0.8 atm.

6. The system of claim 1, wherein the at least one energy storage device comprises a high temperature electrolytic double layer capacitor configured to sustain operating temperatures from −40 degrees Celsius to 300 degrees Celsius without being damaged.

7. The system of claim 1, wherein each of the piezoelectric strands are comprised of a piezoelectric fiber-composite material.

8. The system claim 1, further comprising a weight secured to at least one of:
a. at least one of the piezoelectric strand bundles;
b. a segment of the segmented pendulous member; and
c. at least one of the plurality of tabs; and
wherein the weight serves to increase the coefficient of transfer of energy from each of the piezoelectric strand bundle to the plurality of electrodes.

9. A system to harvest mechanical energy in a wellbore, wherein the mechanical energy comes from motion, the system comprising:
a. a pressure housing with an internal chamber having a bulkhead, wherein the pressure housing is inside a drilling collar and connected to a sub assembly;
b. a segmented pendulous member, the segmented pendulous member having a plurality of segments, with a first segment anchored to the bulkhead in the internal chamber;
c. a plurality of double bow spring stations, wherein each double bow spring station is connected between a pair of segments of the segmented pendulous member, and wherein each double bow spring station comprising:
(a) a top side with a plurality of edges;
(b) a bottom side connected to the top side only at the plurality of edges;
wherein the segmented pendulous member with the plurality of double bow spring stations is configured to simultaneously: (i) swing in a pendulum motion as the motion is transferred to the segmented pendulous member and (ii) move axially using the plurality of double bow spring stations, from the motion transferred from at least one of:
1. a drill bit;
2. a drill string;
3. air as the air moves down the drill string to the drill bit and up an annulus between the drill string and the wellbore;
4. drilling mud as the drilling mud moves down the drill string to the drill bit and up the annulus between the drill string and the wellbore; and
5. a bottom hole assembly connected to the drill string;
d. a plurality of piezoelectric strand bundle sheets with at least one piezoelectric strand bundle sheet mounted to each double bow spring station on at least one of: the top side and the bottom side; and wherein each of the piezoelectric strand bundle sheets comprises a plurality of piezoelectric strands, each of the piezoelectric strands in the piezoelectric strand bundle sheet vibrates as external motion is transferred to the segmented pendulous member which in turn transfers motion to the plurality of double bow spring stations;

e. a plurality of electrodes, wherein at least two electrodes are mounted to each of the piezoelectric strand bundle sheets to receive electricity produced by vibrations of each of the piezoelectric strands; and f. at least one energy storage device for receiving a voltage from the plurality of electrodes.

10. The system of claim 9, wherein the bottom side of each double bow spring stations of the plurality of double bow spring stations is spaced apart from the top side of each of the double bow spring stations of the plurality of double bow spring stations allowing the segmented pendulous member to move along a vertical axis while the plurality of double bow spring station flexes between the connected edges of the plurality of double bow spring stations.

11. The system of claim 9, wherein each segment of the segmented pendulous member is centrally mounted to the top side and to the bottom side of the plurality of double bow spring stations.

12. The system of claim 9, comprising a power conditioning circuit connected to the plurality of electrodes, wherein the power conditioning circuit normalizes electricity from the plurality of electrodes and provides the voltage to the at least one energy storage device within a predetermined range, and wherein the power conditioning circuit comprises a processor.

13. The system of claim 12, further comprising at least one voltage sensor, wherein the at least one voltage sensor is connected to the at least one energy storage device, and wherein the at least one voltage sensor is configured to transmit voltage signals to the power conditioning circuit.

14. The system of claim 9, further comprising a surface voltage health meter comprising a surface processor connected to a surface data storage, wherein the surface data storage comprises:

a. preset energy storage limits;

b. computer instructions to instruct the processor to monitor and display each voltage of the at least one energy storage device on at least one of: at least one display, at least one client device, or the at least one display and the at least one client device; and c. computer instructions to instruct the processor to provide a message to at least one of: the at least one display, the at least one client device, or both the at least one display and the at least one client device when the energy storage device exceeds one of the preset energy storage limits.

15. The system of claim 9, wherein the pressure housing is adapted to sustain an external pressure of at least 20,000 psi while simultaneously maintaining an internal pressure of 0.8 atm.

16. The system of claim 9, wherein the at least one energy storage device comprises a high temperature electrolytic double layer capacitor configured to sustain operating temperatures from −40 degrees Celsius to 300 degrees Celsius without being damaged.

17. The system of claim 9, wherein each of the piezoelectric strands are comprised of a piezoelectric fiber-composite material.

18. The system claim 9, further comprising a weight secured to at least one of:

a. at least one of the piezoelectric strand bundles;

b. the pendulous member; and c. at least one of the plurality of tabs; and wherein the weight serves to increase the coefficient of transfer of energy from each of the piezoelectric strand bundle to the plurality of electrodes.

19. A system to harvest mechanical energy in a wellbore, wherein the mechanical energy comes from motion, the system comprising:

a. a pressure housing with an internal chamber having a bulkhead, wherein the pressure housing is inside a drilling collar and connected to a sub assembly;

b. a pendulous member anchored to the bulkhead of the internal chamber, wherein the pendulous member is configured to swing in a pendulum motion as the motion is transferred to the pendulous member from at least one of:

(i) a drill bit;

(ii) a drill string;

(iii) air as the air moves down the drill string to the drill bit and up an annulus between the drill string and the wellbore;

(iv) drilling mud as the drilling mud moves down the drill string to the drill bit and up the annulus between the drill string and the wellbore; and (v) a bottom hole assembly connected to the drill string;

c. a plurality of tabs, wherein each tab is mounted to the pendulous member, each tab extending away from the pendulous member, and each tab having a first side and a second side;

d. a plurality of piezoelectric strand bundle sheets with at least one piezoelectric strand bundle sheet mounted to each tab of the plurality of tabs on at least one of: the first side and the second side; and wherein each of the piezoelectric strand bundle sheets comprises a plurality of piezoelectric strands, each of the piezoelectric strands vibrates as external motion is transferred to the pendulous member which in turn transfers motion to the plurality of tabs;

e. a plurality of electrodes, wherein at least two electrodes are connected to each of the piezoelectric strand bundle sheets to receive electricity produced by vibrations of each of the piezoelectric strands; and f. at least one energy storage device for receiving a voltage from the plurality of electrodes.

20. The system of claim 19 wherein each of the tabs of the plurality of tabs comprise at least one of:

a. a vertical orientation tab that vibrates due to the pendulum motion of the pendulous member from an anchor point;

b. a horizontal orientation tab that vibrates due to vertical motion of the pendulous member from the anchor point; and c. an angular orientation tab with an orientation bias between the vertical orientation tab and the horizontal orientation tab, the angular orientation tab vibrates from vertical and horizontal motion.

21. The system of claim 19, comprising a power conditioning circuit connected to the plurality of electrodes, wherein the power conditioning circuit normalizes electricity from the plurality of electrodes and provides the voltage to the at least one energy storage device within a predetermined range, and wherein the power conditioning circuit comprises a processor.

22. The system of claim 21, further comprising at least one voltage sensor, wherein the at least one voltage sensor is connected to the at least one energy storage device, and wherein the at least one voltage sensor is configured to transmit voltage signals to the power conditioning circuit.

23. The system of claim 19, further comprising a surface voltage health meter comprising a surface processor connected to a surface data storage, wherein the surface data storage comprises:

a. preset energy storage limits;
b. computer instructions to instruct the processor to monitor and display each voltage of the at least one energy storage device on at least one of: at least one display, at least one client device, or the at least one display and the at least one client device; and
c. computer instructions to instruct the processor to provide a message to at least one of: the at least one display, the at least one client device, or both the at least one display and the at least one client device when the energy storage device exceeds one of the preset energy storage limits.

24. The system of claim 19, wherein the pressure housing is adapted to sustain an external pressure of at least 20,000 psi while simultaneously maintaining an internal pressure of 0.8 atm.

25. The system of claim 19, wherein the at least one energy storage device comprises a high temperature electrolytic double layer capacitor configured to sustain operating temperatures from −40 degrees Celsius to 300 degrees Celsius without being damaged.

26. The system of claim 19, wherein each of the piezoelectric strands are comprised of a piezoelectric fiber-composite material.

27. The system claim 19, further comprising a weight secured to at least one of:
a. each of the piezoelectric strand bundle sheets; and
b. a segment of the segmented pendulous member; and
   wherein the weight serves to increase the coefficient of transfer of energy from each of the piezoelectric strand bundle to the plurality of electrodes.

* * * * *